Feb. 26, 1963 J. L. KILLORAN ET AL 3,078,509
EXTRUSION JET
Filed June 6, 1960 2 Sheets-Sheet 1

Inventors
Joseph L. KILLORAN
Napoléon L. LARUE
By Alan Awabey
Attorney

Inventors
Joseph L. KILLORAN
Napoléon L. LARUE

United States Patent Office 3,078,509
Patented Feb. 26, 1963

3,078,509
EXTRUSION JET
Joseph L. Killoran and Napoleon L. Larue, Drummondville, Quebec, Canada, assignors to Canadian Celanese Limited, Montreal, Quebec, Canada
Filed June 6, 1960, Ser. No. 34,035
5 Claims. (Cl. 18—8)

This invention relates to the production of artificial textile filaments by melt spinning.

Melt spinning is widely used for drawing filaments from thermoplastic materials. These filaments are subsequently used for textile fibres, bristles, ribbons and for other purposes. Certain polymers are difficult to melt-spin because of their rapid rate of degradation and discoloration at melting temperatures. One of these materials is cellulose acetate.

A continuous melt-spinning method adapted to a high extrusion rate, and consequently useful for spinning materials which are degraded by heat, is disclosed in prior application Serial No. 663,225, filed June 3, 1957, now Patent No. 2,955,320, although this method is not limited to spinning such materials.

In that method, the thermoplastic material in powder or granular form is continuously fed under pressure into a confined space where it is moulded into a plug or pellet. The head of the plug lies adjacent to a heated electrical resistance plate or jet so that heat is supplied to its leading surface and a leading layer of the head is thus continuously melted and from this layer filaments are formed and drawn off all the time by extrusion through the jet orifices while the plug is continuously renewed from its feed end by the feeding of further thermoplastic material to take the place of the molten material drawn off. Desirably, the distance between the end of the feed screw and the jet is from about one-third to about two-thirds the diameter of the jet.

The present invention is an improvement in this art increasing the speed at which the thermoplastic material can be melted and thus providing for higher extrusion rates, particularly for multi-filament yarn. In accordance with the present invention, the head of the plug is formed with a leading surface of much greater area than the cross-sectional area a plug having a flat end. Therefore, heat is supplied at the surface of the fusible material over a greater area and melting is faster, substantially in proportion to the excess of leading-surface area to cross-sectional area.

The method of the invention can be carried out in an apparatus according to the invention in which the jet is provided with a heating surface of special form giving it a greater area than the cross-sectional area of the plug forming chamber. One preferred form of jet (describing it in the horizontal position) has an annular horizontal collar, adapted to abut the end of an extruding tube, surrounding a circular bowl portion made up of a downwardly extending outer skirt and a central convexity. The jet openings are provided in a narrow ring between the skirt and convexity.

In a specific preferred form, the convexity is conical and protrudes upwards preferably beyond the level of the collar. Preferably the convexity is thickened symmetrically towards its apex. The collar is connected to wings at each side of the jet which are in turn, connected to terminals forming part of an electrical circuit to provide for an electrical current to pass from terminal to terminal through the jet. Fundamentally, the jet is necked between the wings and the collar and preferably in conjunction with a thickened central portion of the convexity.

Special construction provides for centering the jet with the extruding tube. This ensures symmetry and concentricity of the plug or pellet formed in the extruding operation and consequent even melting and uniform pressure at the respective jet orifices.

*Detailed Description*

Having thus generally described the invention it will be referred to in greater detail by reference to the accompanying drawings illustrating preferred embodiments and in which.

Figure 1:
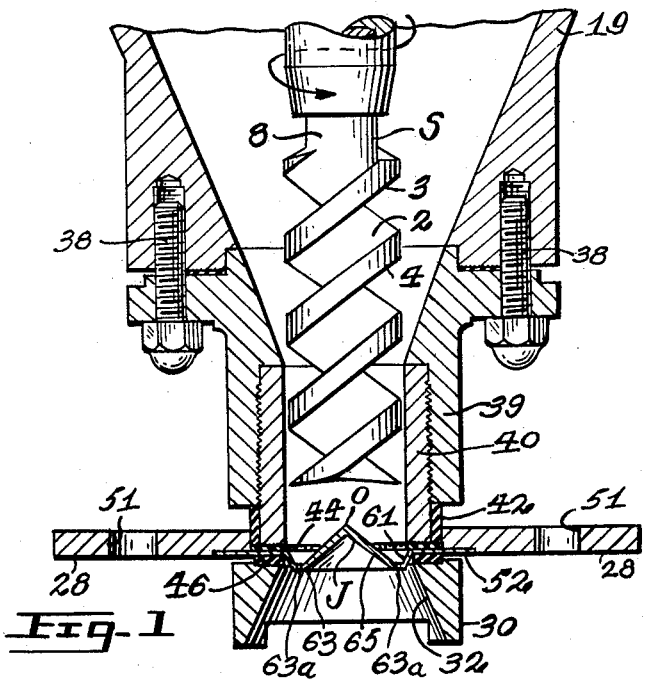
FIGURE 1 is a cross-section through the lower part of a spinning apparatus according to the invention embodying the improved jet and showing its relationship to the feed screw.
Figure 2:
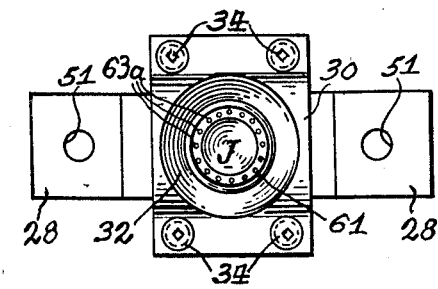
FIGURE 2 is a bottom plan view of the apparatus shown in FIGURE 1.
Figure 4:
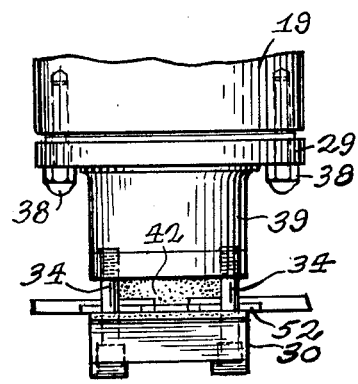
FIGURE 4 is a side elevation of the lower part of the apparatus showing particularly the manner of clamping the jet assembly to the end of the feed tube.

Referring more particularly to the drawings, the apparatus, generally speaking, is made up of a supply pot in which the material to be extruded is held which terminates in a funnel 19 which in turn is connected to a casting 39. In the form of the invention shown the casting 39 is a separate piece flanged and bolted concentrically to the lower end of the funnel 19 by bolts 38. The casting 39 is also provided with an externally threaded extrusion tube 40 screwed into the internally threaded end of the casting 39.

Operating within the supply pot and extending through the funnel 19 and into the tube 40 is an extruding screw indicated generally by S. The screw S is made up of a shaft 8 provided with helical vanes 3 and 4 intervened by helical channels 2.

Means is provided for journalling and rotating the shaft 8. The supply pot and extrusion assembly are designed for a gas-tight operation. The over-all construction of the extruding apparatus is disclosed in the prior application referred to above. The present invention is based on a particular form as will be described.

*Jet Assembly*

The jet J is mounted on two heavy, separate terminals 28, preferably made of electrolytic copper, for maximum conductivity. The terminals 28 are riveted as at 27a and brazed on to wings 52 which form an integral part of the jet J. This method of connecting is designed to provide the lowest possible electrical resistance in the joint between the jet and the terminals. This is desirable for minimum heat loss. Each terminal 28 is provided with a curved end 28a which registers with a curved shoulder 5 of the jet proper, to present a substantially continuous curved surface in the axial direction of the tube 39. These curved surfaces, one at each side, fit about the end of the tube 40 and serve to hold the jet J exactly concentric with the extrusion tube. An insulating ring 42 intervenes the curved surfaces 28a, 5 and the tube 40.

The terminals 28 are provided with openings 51 to receive bolts for connecting the jet to the electrical power supply. Electrical connections (not shown) are provided for passing a current through the member J from one side to the other, that is, from one copper terminal 28 to the other so as to heat the jet J by electrical resistance.

Figure 3:
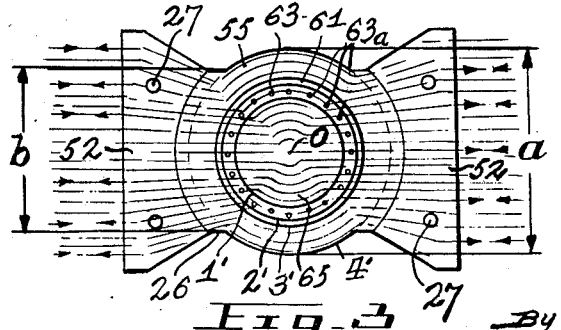
FIGURE 3 is a top plan view of the resistance element of the jet shown in FIGURES 1 and 2, with chain lines and arrows showing the path of current through the element.
Figure 5:
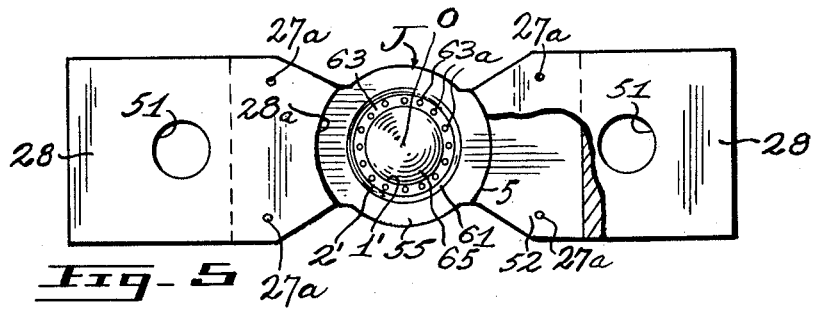
FIGURE 5 is a top plan view of a jet assembly, including resistance element and terminals of the apparatus showing particularly the relationship between the jet proper and its electrical terminals.
Figure 6:
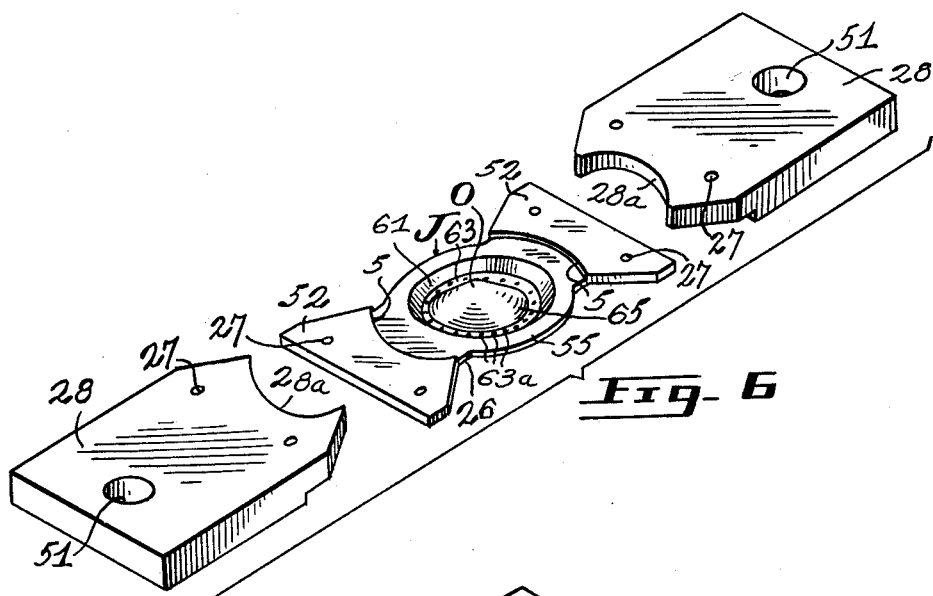
FIGURE 6 is an exploded view showing the construction of the jet proper and its terminals.

The active part of the jet includes a collar part 55 between the circle 3' and the circle 4' (see FIGURE 3). The collar 55 abuts the end of the extrusion tube 40 and combined with the gasket 44 acts as a sealing ring to prevent leakage of the molten filament-forming material.

The jet is clamped against the end of the tube 40 by a clamping member 30 having an upper surface which engages an insulating gasket 46 which bears against the undersurface of the ring 55 of the jet J and forces it upwards against the gasket 44 which in turn bears against the end of the tube 40. The clamping member 30 projects to either side of the jet assembly as shown. The member 30 is provided with an opening 32 directly beneath the working part of the jet and tapering as shown in FIGURE 1. Bolts 34 extending through the member 30 bolt it to the flange 28 of the casting 39. In this way, the clamping member 30 may be tightly forced against the jet assembly to hold it concentrically in place against the end of the tube 40.

The active part of the jet J also includes an integral inverted skirt 61, which, in its preferred form, is actually a frustum of a cone bordered at its maximum diameter by the circle 3' and its minimum diameter by the circle 2' (see FIGURE 3) extending downwards from the collar 55. Integrally attached to the bottom of the skirt 61 is a concentric flat ring 63 between the lines 1' and 2' (FIGURE 3). The ring 63 contains a multiplicity of holes 63a in one or more concentric circles. The enclosure is completed by an integral, central, conical part 65 which extends upwards from the ring 63 bordered on its maximum diameter by circle 1' and culminating in its apex O. The convexity 65 preferably becomes gradually thicker at its upper part as shown.

Referring now to FIGURE 3, the dimension $a$ is the diameter of the outer annular ring or collar 55 bordered by circle 4' and the dimension $b$ is the minimum width (neck 26) of the integral wings 52 which serve as terminals for conducting the electrical heating current to the outer edge of the outer annular collar 55.

The chain lines and arrows on FIGURE 3 show how the heating current is made to converge to provide the maximum concentration at the neck 26 where the terminal 28 attaches to the periphery of the collar 55 and how this concentration reduces in passing across the jet in order to provide for uniform heating. The concentration of the heating current at the neck 26 also provides extra heat at this point to compensate for heat conducted away and lost by radiation from the wings 52 and the terminals 28.

A preferred slope of the outer conical surface 61 from the axis of the tube 39 is 22°. A preferred slope of the upper surface 65 from the axis of the tube 39 is 55°. Both of these angles could be made more acute without interfering with the function of the jet, however, if these angles were made larger the area of the active surfaces would be reduced and the rate of production correspondingly reduced. For example, the slope of the surface 61 can range between 15° and 45° from the axis of the tube 40, without departing from the principle of the invention. Likewise, the angle of the slope of the central cone 65 can vary from about 40° to about 65° from the axis of the tube 40.

The ratio of dimension $b$ to dimension $a$ must be maintained within quite close tolerances in order to control the concentration of heating current in the collar 55 and in the active parts of the jet. In a preferred design, where the thickness of the jet is about .060 inch and the inside diameter of the extruding tube is about 1.18 inches, the ratio of dimension $a$ to dimension $b$ would be about 1.39:1.

Other ratios between dimension $a$ and dimension $b$ which have been found satisfactory for other sizes of apparatus and different thicknesses of heating alloy in the jet and different types of polymer are from 1.28 to 1.51. Finding a suitable specific ratio to carry out the principle of the invention for any particular size of extrusion tube is a matter of experimentation as will be clear to one skilled in the art.

*Operation*

In operation the supply pot including the funnel 19 is loaded with the filament-forming material. The electrical current is passed through the jet J so that the latter is brought to a temperature above the melting point of the material. The approximate concentration and flow of current through the jet proper is shown in FIGURE 3 and explained above. Rotation of the screw S is then started and the material is thus fed from the funnel 19 into and through the tube 40 and against the jet. The material between the end of the feed screw and the jet is consolidated into a solid plug. The leading end of this plug is melted by the jet and molten material is drawn off through the orifices 63a as filaments. The feeding speed is regulated in coordination with the temperature of the jet so that the material is continuously consolidated into a solid plug between the end of the feed screw and the jet and the molten material is drawn off as filaments as quickly as it becomes molten. Because of the special shape of the jet J, which is a feature of the inention, the melting rate and consequently the rate of extrusion can be increased by at least 50% in comparison with a flat jet.

The end of the screw S is close enough to the resistance plate that the pressure is effective to compress the material into a solid block and far enough from the plate that it is out of range of stirring action caused by the pitch of the screw which would cause uneven extrusion. There is bound to be a certain amount of stirring action at the end of the screw because the material leaves the end of the screw by way of the helical grooves 2. A preferred distance from the end of the feed screw to the resistance plate is from about one-third to about two-thirds the diameter of the screw, i.e. of the chamber.

It is possible to make the convexity 65 in various forms from conical, hemispherical or intermediate curved surfaces and radial depressions of various shapes and thicknesses to increase extrusion rates. Ribbed surfaces may be employed. The surface area can be increased to above 50% greater than that of flat jets of the same diameter. Preferably, the surface area of the central dished portion will be at least 10% greater than that of a flat jet.

The jet should be of a metal of high electrical resistance. Heater or resistor alloys are preferred, for example, nickel-chromium alloys. Those sold under trademark names of "Chromel" or "Nichrome" are most satisfactory. Stainless steel can also be used. The tube 40 is of steel or other metals not attacked by the material being extruded.

The thickness of the jet can vary and will depend on its size. Generally speaking, the thickness will run from about $35/1000$ inch to about $1/10$ inch.

Spinning orifices from 0.008 inch to 0.060 inch (eight to sixty thousandths) diameter are suitable for spinning cellulose triacetate of different deniers. The choice of a spinning orifice for any particular denier or other material will be evident to those skilled in the art.

The range of temperature suitable for spinning cellulose triacetate is from about 300° C. to about 400° C. The selection of a suitable temperature for spinning any particular denier or other material will be evident to those skilled in the art. The range of pressure at the end of the screw may vary between about 300 pounds per square inch of cross-sectional area of the tube to about 1,000 pounds per square inch of a cross-sectional area of the tube depending on the extrusion rate which in turn depends on the screw speed and the heating current.

Quantitatively, the rate of extrusion will vary depending upon the specific nature of the apparatus used, its size and other factors. In some cases, the extrusion rate of a flat jet with an extruding tube $13/16$ inch inside diameter is 8 to 10 grams per minute for a particular apparatus and for a corresponding apparatus with a conical jet the feed speed is given as 12 to 14 grams per minute.

*Alternative Form*

Figure 7:
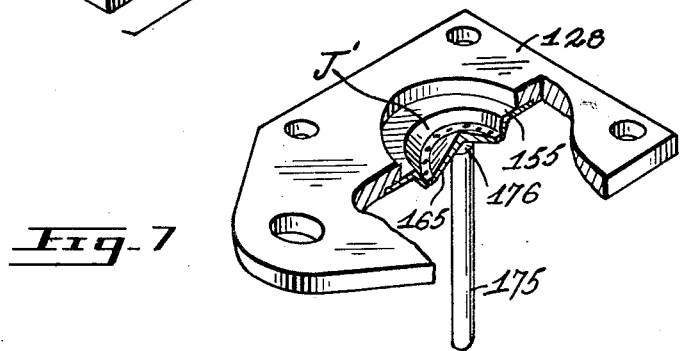
FIGURE 7 is a perspective view of an alternative form of jet assembly.

FIGURE 7 illustrates a modified form of the invention. Similar reference numerals are used for similar parts as in the description of the previous form except that they have been raised by 100.

In this instance, however, one terminal member 128 completely surrounds the collar 155. And, the other terminal 175 is centrally placed and is in the form of a vertical rod which has a conical end 176 which engages the undersurface of the convexity 165. The plate 128 as one terminal and the rod 175 as the other are connected to the electrical circuit so that current will flow from the rod 175 through its conical end 176 and thence through the jet J' to the plate 128.

*Advantages*

For melt spinning labile materials the present invention has the following advantages over previous designs of jet (spinnerette):

(1) By virtue of its double conical shape and consequent increased surface area it has at least 50% more melting capacity than a flat jet.

(2) By virtue of the concentric arrangement of the two conical surfaces combined with the flat intermediate ring and the flat annular ring having the two integral terminals projecting symmetrically on either side at 180° from each other, uniform heating of the active surface is provided.

(3) By virtue of the uniform temperature thus provided melting of the polymer which is continually forced against the active surface proceeds under optimum conditions without degradation which would be caused by hot portions and without partial melting of the polymer which would be caused by cold portions and would result in blockage of spinnerette holes and missing filaments.

(4) This jet is particularly suitable for heat labile materials which cannot be maintained at molten temperature except for a very brief period of time and cannot be successfully extruded (melt spun) except within a very narrow range of temperature and within this range the molten polymer is very viscous to such an extent that there is little or no transfer of heat or flow of material in the liquid phase between the time of melting and the time of extrusion.

(5) In order to produce a commercially acceptable multi-filament yarn the rate of extrusion through each hole of the spinnerette must be substantially equal and since the thickness of the molten layer between the active surface of the jet and the solid polymer is only of the order of a few thousandths of an inch it follows that the size of the filaments issuing from each hole of the spinnerette is dependent on the temperature of the metal immediately surrounding and serving said hole. It is possible with this invention to adjust the density of the heating current of the metal to obtain substanially uniform rate of extrusion through each hole of the multi-filament spinnerette.

(6) Again by virtue of the double conical surfaces and the trough formed between them containing the spinnerette holes the molten material is directed towards the holes.

(7) The outer inverted cone acts in principle similarly to the dished end of a pressure vessel and the inner cone acts similarly to an inverted dished pressure head, the combination of the two providing an enclosure of sufficient mechanical strength to resist without bulging, the thrust of the extrusion screw which continually forces the polymer against it.

(8) Another advantage of this invention is in preventing the formation of gas bubbles which form wherever the polymer is heated too long or at too high a temperature. These bubbles cause interruption of the filaments and prevent production of commercial quality of yarn.

This application is a continuation-in-part of application Serial No. 707,163, filed Jan. 6, 1958, and now abandoned.

We claim:

1. An extrusion jet for melt-spinning multifilament yarn designed for attachment to the end of an extrusion tube comprising, an electrical resistance plate having a central conical portion merging at its base into an integral annular orificed flat circular portion and extending outwards and upwards from said flat circular portion to form an integral inverted frusto-conical portion, and extending outwards from said inverted frusto-conical portion to form an integral flat annular collar adapted to abut the end of an extrusion tube, the thickness of the conical portion being greatest at the apex and tapering towards the base, symmetrical diametrically opposed wings integral with the annular circular portion extending outwards therefrom and attached at their extremities to metal terminals of relatively high conductivity adapted for connection to an electrical power supply, the resistance plate having a resistivity throughout effective to provide a substantially uniform temperature over the heating surface and being of sufficient strength to withstand the pressure of extrusion, said wings being necked at their connection to the annular collar with the thickness of the conical center portion to provide distribution of current density to achieve substantially uniform temperature over the entire heating area of the jet.

2. An extrusion jet, as defined in claim 1, in which each wing includes a neck extending outwardly from the collar portion of the same thickness as the collar portion and in which the ratio between the diameter of the collar portion and the width of the neck is from about 1.28 to about 1.51.

3. An extrusion jet, as defined in claim 1, in which the inner ends of the terminal members have an arcuate shoulder concentric to the central cone and adapted to fit about the end of the extrusion tube to serve as centering means for the jet on the tube.

4. An extrusion jet in accordance with claim 1 wherein the surface areas for contact with the thermoplastic material to be extruded are at least 10% greater than that of a flat plate of the same diameter.

5. An extrusion jet as defined in claim 1 wherein the frusto-conical portion extends inwardly from the collar portion and at an angle ranging from 15° to 45° and the central conical portion is inclined at an angle to the collar from about 40° to about 65°.

References Cited in the file of this patent

UNITED STATES PATENTS

| 2,615,060 | Marinace et al. | Oct. 21, 1952 |
| 2,693,004 | Iwamae | Nov. 2, 1954 |
| 2,773,496 | Czarnecki | Dec. 11, 1956 |
| 2,822,237 | Iwamae | Feb. 4, 1958 |
| 2,898,628 | Phipps | Aug. 11, 1959 |
| 2,955,320 | Palmer et al. | Oct. 11, 1960 |

FOREIGN PATENTS

| 628,467 | Great Britain | Aug. 30, 1949 |
| 748,772 | Great Britain | May 9, 1956 |